(12) United States Patent
Lam et al.

(10) Patent No.: US 6,373,660 B1
(45) Date of Patent: Apr. 16, 2002

(54) METHOD AND SYSTEM FOR PROVIDING A PERMANENT SHUNT FOR A HEAD GIMBAL ASSEMBLY

(75) Inventors: Chung Fai Lam, San Jose; Caleb Kai-lo Chang, Sunnyvale; Dino Tommy Anthony Martinez, San Jose; Dallas W. Meyer, Danville; Seila Chao Chim, San Jose, all of CA (US)

(73) Assignee: Read-Rite Corporation, Milpitas, CA (US)

( * ) Notice: Subject to any disclaimer, the term of this patent is extended or adjusted under 35 U.S.C. 154(b) by 0 days.

(21) Appl. No.: 09/525,929

(22) Filed: Mar. 14, 2000

(51) Int. Cl.$^7$ .................................................. G11B 5/48
(52) U.S. Cl. .................... 360/234.5; 360/245.8
(58) Field of Search .............................. 360/245.8, 246, 360/234.5, 128

(56) References Cited

U.S. PATENT DOCUMENTS

| | | |
|---|---|---|
| 4,841,395 A | 6/1989 | Craft |
| 4,987,514 A | 1/1991 | Gailbreath et al. |
| 5,142,425 A | 8/1992 | Gailbreath, Jr. et al. |
| 5,247,413 A | 9/1993 | Shibata et al. |
| 5,253,134 A | 10/1993 | Kato et al. |
| 5,272,582 A | 12/1993 | Shibata et al. |
| 5,465,186 A | 11/1995 | Bajorek et al. |
| 5,491,605 A | 2/1996 | Hughbanks et al. |
| 5,539,598 A | 7/1996 | Denison et al. |
| 5,559,051 A | 9/1996 | Voldman et al. |
| 5,566,038 A | 10/1996 | Keel et al. |
| 5,644,454 A | 7/1997 | Arya et al. |
| 5,680,274 A | 10/1997 | Palmer |
| 5,699,212 A | 12/1997 | Erpelding et al. |
| 5,812,349 A | 9/1998 | Shouji et al. |
| 5,835,308 A | 11/1998 | Hasegawa |
| 5,901,014 A | 5/1999 | Hiraoka et al. |
| 6,034,851 A | * 3/2000 | Zarouri ....................... 360/246 |

* cited by examiner

*Primary Examiner*—A. J. Heinz
(74) *Attorney, Agent, or Firm*—Sawyer Law Group LLP

(57) ABSTRACT

A method and system for protecting a magnetoresistive (MR) head from electrostatic discharge damage is disclosed. The MR head includes an MR sensor having a first end and a second end. The MR head is coupled with a suspension assembly including a first lead coupled with the first end of the MR sensor, a second lead coupled with the second end of the MR sensor, and an insulating film supporting first and second portions of the first and second leads. In one aspect, the method and system include providing first and second test pads coupled with the first and second leads, respectively. The first and second test pads are for testing the MR head. The method and system also include providing a permanent resistor coupled to the first and second test pads. The permanent resistor has a resistance of less than approximately ten thousand ohms. In another aspect, the suspension assembly includes first and second head gimbal assembly pads coupled to the first and second leads, respectively. In this aspect, the method and system include coupling a permanent resistor coupled to the first and second head gimbal assembly pads. In another aspect, the MR head is included in a slider having first and second pads for providing current to the MR sensor. In this aspect, the method and system include coupling a permanent resistor to the first and second pads.

15 Claims, 13 Drawing Sheets

METHOD AND SYSTEM FOR PROVIDING A PERMANENT SHUNT FOR A HEAD GIMBAL ASSEMBLY

FIELD OF THE INVENTION

The present invention relates to magnetoresistive heads and more particularly to a method and system for providing electrostatic discharge protection for magnetoresistive heads, particularly in devices using a flex-on suspension or trace-suspension assembly.

BACKGROUND OF THE INVENTION

FIG. 1 is a block diagram of a portion of a suspension assembly used in magnetoresistive (MR) technology. Depicted with the suspension assembly 50 is a slider 1 including an MR head 10 used in reading magnetic recording media. Typically, the slider 1 includes a merged head. Thus, the MR head 10 is part of a merged head that also includes a write head. However, for clarity, only the MR head 10 is shown. The MR head 10 includes an MR sensor 30. Typically, the MR sensor 10 is an anisotropic magnetoresistive (AMR) sensor or a giant magnetoresistive (GMR) sensor. The slider 1 also includes pads 42, 44, 46 and 48. Two pads 42 and 44 are used for making electrical contact to the MR sensor 30 from other portions of the suspension assembly 50. The other two pads 46 and 48 may be used in making electrical contact to the write head.

In order to use the MR head 10 in a disk drive, electrical connection is made to the MR sensor 30 via the pads 42 and 44. In some conventional systems, a twisted pair of wires is used to connect to the leads 42 and 44. However, the conventional suspension assembly 50 typically provided in order to couple the MR sensor 30 to the remaining electronics (not shown).

The conventional suspension assembly 50 is preferably used with a flex-on suspension (FOS) developed by Read-Rite Corporation of Milpitas, California, in a trace suspension assembly (TSA), or in a cable on suspension (COS). The conventional suspension assembly 50 has a wireless electrical connection with the MR head 10 that allows for a smaller form factor for the head and head-gimbal assembly.

The conventional suspension assembly 50 typically includes a metal arm (not shown) and typically is mechanically coupled with the slider 1. The conventional suspension assembly 50 includes a first lead 52, a second lead 54, a third lead 56 and a fourth lead 58. Note, however, that the third lead 56 and fourth lead 58 may be omitted if the slider assembly 1 does not include a write head. The leads are typically surrounded by an insulating film 60. The insulating film 60 is typically made of polyimide and includes two layers of kapton. The film 60 generally surrounds the leads 52, 54, 56 and 58. Thus, in the conventional suspension assembly 50 the leads 52, 54, 56 and 58 are typically sandwiched between two layers of film 60. The conventional suspension assembly 50 also includes four head gimbal assembly pads 62, 64, 66 and 68 coupled with the leads 52, 54, 56 and 58, respectively. The leads 52 and 54 are also electrically coupled with the MR sensor 30, preferably through pads 42 and 44. Thus, electrical connection can be made to the MR sensor 30 even when the MR head 10 is sufficiently small for use with current high-density recording media.

During manufacture of the conventional suspension assembly 50, the MR head 10 is tested. Consequently, a testing portion 70 of the conventional assembly is typically provided. The testing portion 70 includes test pads 72, 74, 76 and 78 coupled with leads 82, 84, 86 and 88, respectively, that are on a portion of insulating material. Generally, the insulating material is continuous. Thus, the insulating in the testing portion 70 is generally also made of kapton. The first test pad 72 and the second test pad 76 are coupled with the MR sensor 30 via leads 82 and 84, leads 52 and 54, and pads 42 and 44, respectively. The third test pad 76 and the fourth test pad 78 are coupled with the write head via leads 86 and 88, leads 56 and 58, and pads 46 and 48, respectively. Using the first test pad 72 and the second test pad 74 the MR head 10 is tested. Typically, the testing includes a magnetic test and a quasi-static test. In the quasi-static test, the environment in which the slider 1 will function is simulated and the response of the MR sensor 30 tested. In the magnetic test, the slider 1 is actually flown over a disk and the response of the MR sensor 30 tested. Thus, it can be determined whether the MR head 10 functions prior to providing the conventional suspension assembly 50 to a customer.

Although the conventional suspension assembly 50 functions in FOS and TSA embodiments, one of ordinary skill in the art will readily realize that the conventional suspension assembly 50 and head 10 are subject to failure. During fabrication, the MR sensor 30 is often rendered inoperative. In some cases, losses may be as high as ten to twenty percent. It has been determined that these losses are due to tribo-charging of the film 60 in the suspension assembly 50. As higher density recording media is used, the MR head 10 is built smaller to be capable of reading high-density recording media. As the MR head 10 is reduced in size, more damage to the MR sensor 30 can be caused by smaller transient currents due to electrostatic discharge.

For example, during manufacture, electrical contact is often made to the test pads 72, 74, 76 or 78. When a charged metal fixture touches the test pad 72 or 74, the charge can be transferred to the test pad 72 or 74. The charge on the test pad 72 or 74 could cause a large transient current to flow through the MR sensor 30 as the charge is discharged. The transient current can easily destroy the MR sensor 30. Thus, the MR sensor 30 may be damaged or destroyed due to electrostatic discharge (ESD)

Many conventional systems have been developed for protecting the MR head 10 from damage due to ESD. Some conventional methods connect a very low resistance conductor between the leads 52 and 54 or the leads 82 and 84. The conductor typically has a resistance of only a few ohms or less. In other words, the leads 52 and 54 or 82 and 84 are shorted. As a result, the transient current can be prevented. Other conventional methods connect a very high resistance shunt between the leads 52 and 54 or the leads 82 and 84, or between one of the leads 52, 54, 82 or 84 and ground. The high resistance shunt is typically on the order of $10^6$ Ohms. The high resistance shunt allows any charge accumulated on the conventional suspension assembly 50 to be slowly dissipated. Thus, the MR sensor 30 may be preserved.

Although the very high resistance and very low resistance shunts can function, one of ordinary skill in the art will readily recognize that such shunts are typically temporary and, therefore, removable. For example, refer to FIG. 2, which depicts a conventional suspension assembly 50' described in co-pending U.S. patent application Ser. No. 08/055,729 entitled "SHORTING BAR AND TEST CLIP FOR PROTECTING MAGNETIC HEADS FROM DAMAGE CAUSED BY ELECTROSTATIC DISCHARGE DURING MANUFACTURE" and assigned to the assignee of the present invention. Also depicted is the slider 1 and MR head 10. Most of the components of the conventional suspension assembly 50' are the same as those of the conventional assembly 50, depicted in FIG. 1. Consequently, the components are labeled similarly to the conventional suspension assembly 50. For example, the MR head 10' in the conventional suspension assembly 50' corresponds to the MR head 10 in the conventional suspension assembly 50.

The conventional suspension assembly 50' includes a low resistance conductive shunt 92 on an insulating material 90 that is coupled with the testing portion 70'. Typically, the insulating material 90 is an additional piece of kapton that is generally made by lengthening the insulating material for the testing portion 70'. The kapton 90 is flexible and can be folded over to bring the shunt 92 in contact with the test pads 72', 74', 76' and 78'. Usually, the shunt 92 is sufficiently long to short at least the test pads 72' and 74' which lead to the MR sensor 30. A clip (not shown) holds the shunt 92 in place during use to ensure that electrical contact is made between the shunt 92 and the test pads 72' and 74'. Thus, in order to provide protection from ESD induced damage, the insulating material 90 is folded at joint 94 to bring the shunt 92 into contact with the test pads 72' and 74' and clipped in place. Once the shunt 92 is in contact with the test pads 72' and 74', the MR sensor 30 is protected from electrostatic discharge. When manufacture is complete, the clip can be removed to allow the MR sensor 30 to operate. Furthermore, the kapton 90 and shunt 92 may be cut off at the joint 94. Other conventional shunts operate similarly in that they too are typically temporary and removed prior to use. For example, the test pads 72' and 74' or the leads 52 and 54 coupled with the MR sensor 30 may be shorted by a solder bar which is removed when manufacture has completed.

Although the conventional suspension assembly 50' functions adequately for its intended purpose, one of ordinary skill in the art will readily see that the conventional suspension assembly 50', as well as other conventional mechanisms for protecting the MR head 10 from ESD damage are temporary. Prior to contacting the shunt 92 with the test pads 72' and 74', the MR sensor 30 is not protected. Similarly, once the clip holding the shunt 92 in place is removed, the shunt 92 no longer protects the MR sensor 30 from damage. Thus, the MR head 10 may still be subject to failure due to ESD induced damage during manufacture.

Accordingly, what is needed is a system and method for providing ESD protection for MR heads during fabrication. The present invention addresses such a need.

SUMMARY OF THE INVENTION

A method and system for protecting a magnetoresistive (MR) head from electrostatic discharge damage is disclosed. The MR head includes an MR sensor having a first end and a second end. The MR head is coupled with a suspension assembly including a first lead coupled with the first end of the MR sensor, a second lead coupled with the second end of the MR sensor, and an insulating film supporting first and second portions of the first and second leads. In one aspect, the method and system include providing first and second test pads coupled with the first and second leads, respectively. The first and second test pads are for testing the MR head. The method and system also include providing a permanent resistor coupled to the first and second test pads. The permanent resistor has a resistance of less than approximately ten thousand ohms. The permanent resistor also does not adversely affect the functionality of the MR sensor because the resistance of the MR sensor is sufficiently large. In another aspect, the suspension assembly includes first and second head gimbal assembly pads coupled to the first and second leads, respectively. In this aspect, the method and system include coupling a permanent resistor coupled to the first and second head gimbal assembly pads. In another aspect, the MR head is included in a slider having first and second pads for providing current to the MR sensor. In this aspect, the method and system include coupling a permanent resistor to the first and second pads.

According to the system and method disclosed herein, the present invention provides greater robustness against damage due to electrostatic discharge.

DETAILED DESCRIPTION OF THE INVENTION

Figure 1:
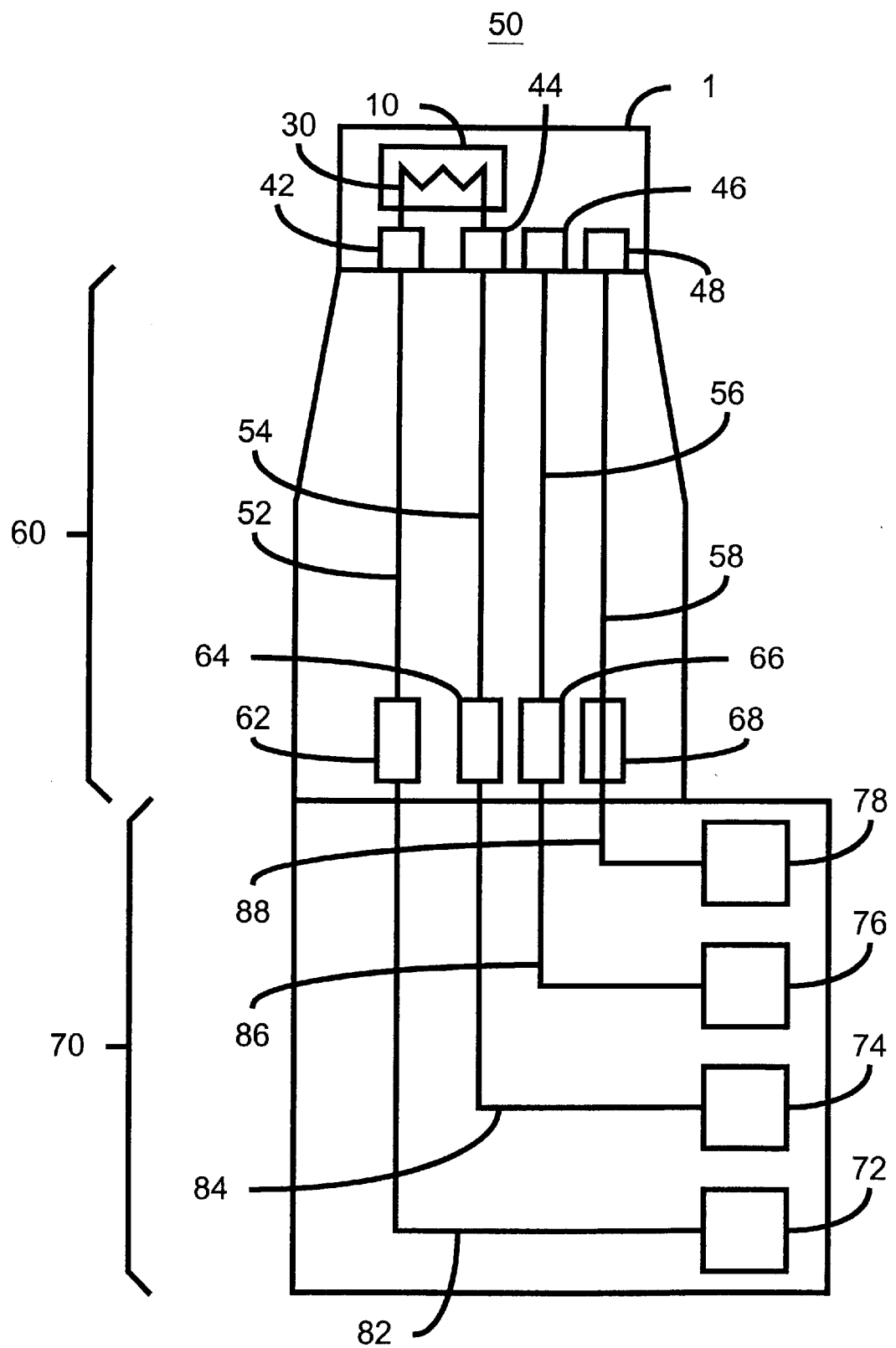
FIG. 1 is a block diagram of a conventional suspension assembly.
Figure 2:
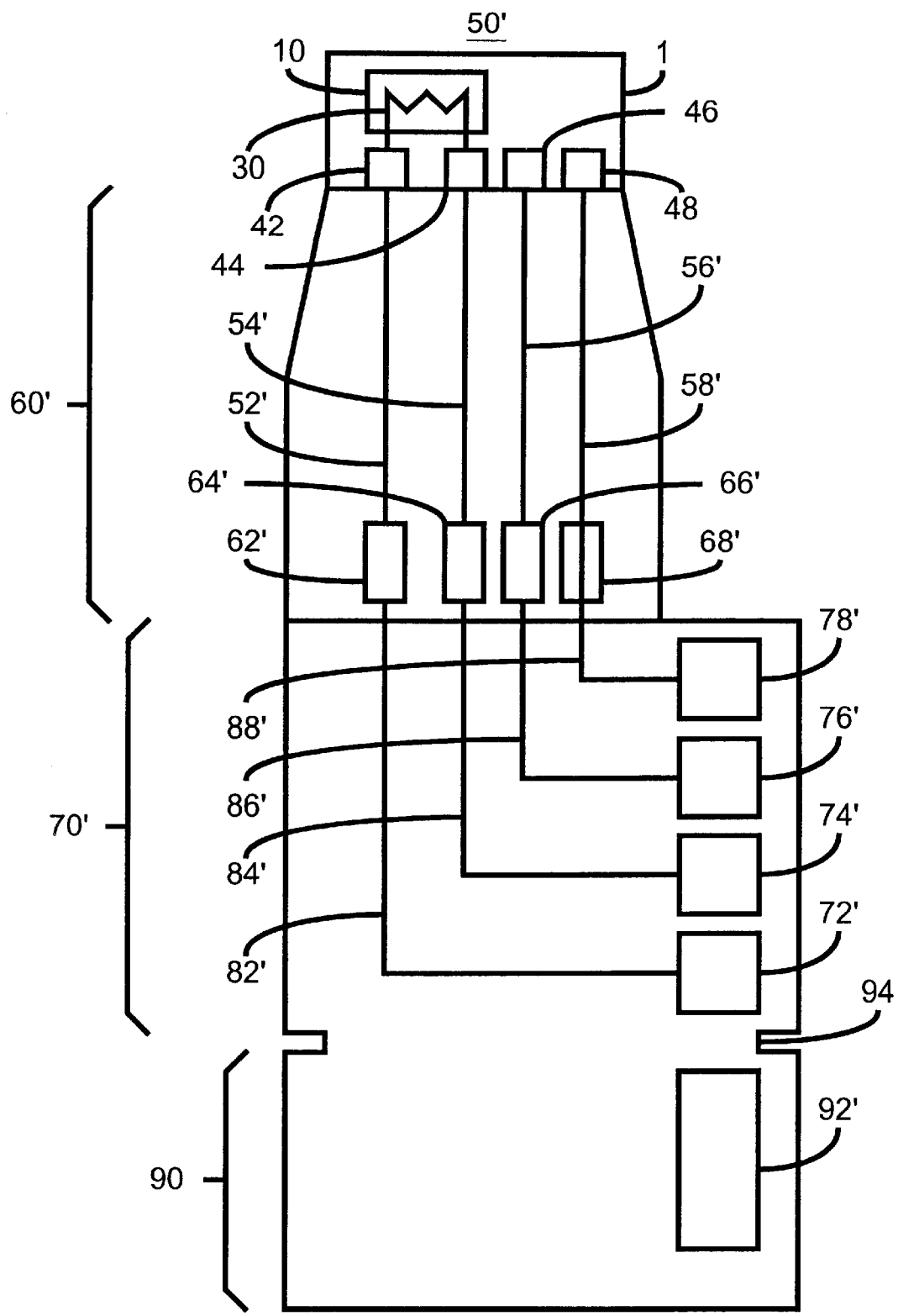
FIG. 2 is a block diagram of one conventional mechanism for providing ESD protection for an MR head during manufacturing.

The present invention relates to an improvement in magnetoresistive head technology. Thus, the present invention can be used with anisotropic magnetoresistance (AMR) sensors as well as giant magnetoresistance (GMR) sensors. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Conventional magnetoresistive (MR) heads finding increased usage as read heads, typically as part of a merged head that includes an MR head for reading and an inductive write head for writing. The MR heads typically include an anisotropic magnetoresistive (AMR) sensor or, for higher density applications, a giant magnetoresistive (GMR) sensor. As technology moves to higher densities, the MR sensors in the MR heads are made smaller and, therefore, more fragile. In particular, transient currents due to electrostatic discharge (ESD) can damage or destroy an MR sensor, rendering the MR head inoperable.

Conventional mechanisms for reducing ESD induced damage including providing a very low resistance shunt or a very high resistance shunt. The very low resistance shunt is typically a few ohms or less. The very high resistance shunt is typically at least $10^5$ ohms or greater. Although these conventional shunts can protect the MR sensor from damage, one of ordinary skill in the art will readily realize that the shunts are typically temporary. Thus, ESD induced damage may still occur before the shunt is provided or after the shunt is removed. Consequently, there is still a significant number of MR heads which fail because of ESD damage suffered during manufacture.

A method and system for protecting an MR head from electrostatic discharge damage is disclosed. The MR head includes an MR sensor having a first end and a second end. The MR head is coupled with a suspension assembly including a first lead coupled with the first end of the MR sensor, a second lead coupled with the second end of the MR sensor, and an insulating film supporting first and second portions of the first and second leads. In one aspect, the method and system include providing first and second test pads coupled with the first and second leads, respectively. The first and second test pads are for testing the MR head. The method and system also include providing a permanent resistor coupled to the first and second test pads. The permanent resistor has a resistance of less than approximately ten thousand ohms. The permanent resistor also has a resistance which is large enough so that the permanent resistor does not adversely affect the function of the MR head. In another aspect, the suspension assembly includes first and second head gimbal assembly pads coupled to the first and second leads, respectively. In this aspect, the method and system include coupling a permanent resistor coupled to the first and second head gimbal assembly pads. In another aspect, the MR head is included in a slider having first and second pads for providing current to the MR sensor. In this aspect, the method and system include coupling a permanent resistor to the first and second pads.

The present invention will be described in terms of a particular suspension assembly and particular heads. However, one of ordinary skill in the art will readily recognize that this method and system will operate effectively for other suspension assemblies and other heads.

Figure 3A:
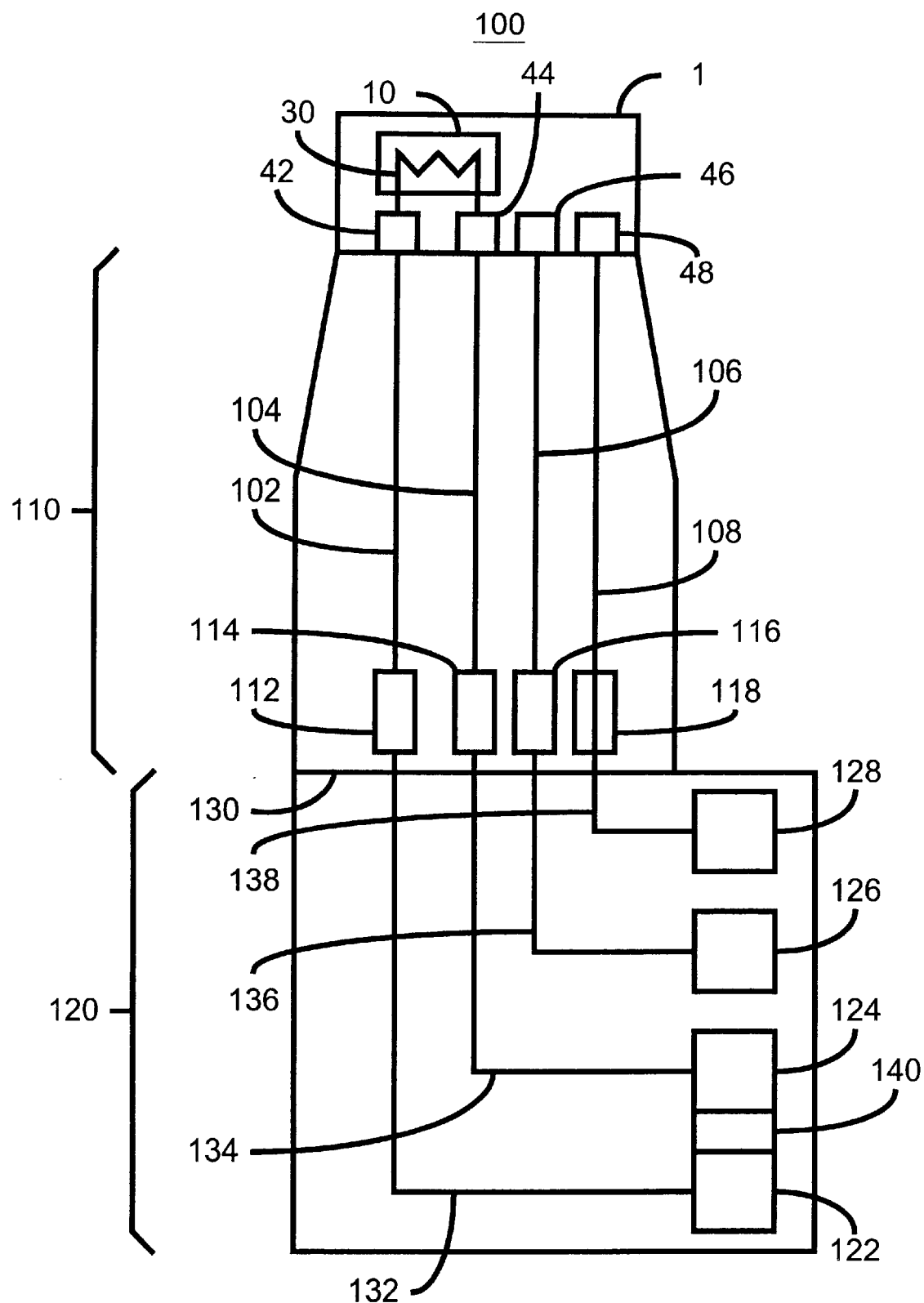
FIG. 3A is a block diagram of one embodiment of a first embodiment of a suspension assembly in accordance with the present invention.

To more particularly illustrate the method and system in accordance with the present invention, refer now to FIG. 3A, depicting one embodiment of a suspension assembly 100, as well as a slider 1 including an MR head 10 which has an MR sensor 30. Typically, the MR sensor 30 is a GMR sensor. Furthermore, the slider I also preferably includes a write head and is, therefore, a merged head, only the MR head 10 is shown for the purposes of clarity. Furthermore, although the MR sensor 30 is depicted as the only component of the MR head 10, the MR head 10 typically includes other components. Also depicted on the MR 10 are pads 42, 44, 46 and 48. Pads 42 and 44 are connected with the MR sensor 30. The pads 46 and 48 are coupled with the write head (not shown).

The suspension assembly 100 is preferably a FOS or TSA suspension assembly. The suspension assembly 100 includes an insulating layer 110 which holds leads 102, 104, 106 and 108. Leads 102 and 104 are coupled to pads 42 and 44 and, therefore, to the MR sensor 30. The leads 106 and 108 are coupled to the pads 46 and 48 and, therefore, to the write head. Also on the insulating layer 110 are head gimbal assembly pads 112, 114, 116 and 118 coupled to leads 102, 104, 106 and 108, respectively. The insulating layer 110 is preferably a polyimide, such as kapton. The insulating layer 110 preferably surrounds the leads 102, 104, 106 and 108. In a preferred embodiment, the insulating layer 110 is composed of two sheets of kapton between which the leads 102, 104, 106 and 108 are sandwiched. However, nothing prevents the use of an assembly in which the leads 102, 104, 106 and 108 are not sandwiched between layers of kapton.

The suspension assembly 100 also includes a test section 120 which includes an insulating layer 121. The insulating layer 121 is preferably part of the insulating layer 110 and is, therefore, preferably made of kapton. The test section 120 also includes test pads 122, 124, 126 and 128 coupled with leads 132, 134, 136 and 138, respectively. Thus, the test pads 122 and 124 are coupled with the MR sensor 30. The test pads 126 and 128 are coupled with the write head. The test pads 122 and 124 are preferably used to perform magnetic testing and quasi-static testing. The quasi-static test emulates the conditions under which the MR head 10 will operate and checks the response of the MR sensor 30. The magnetic test flies the MR head 10 over a disk and checks the MR head 10 under the actual operating conditions. A cut-off line 130 is also provided. The cut-off line 130 allows the test section 120 to be cut off from the suspension assembly 100 after manufacturing is complete.

The test section 120 also includes a moderately high resistance shunt 140 that is coupled directly to the pads 122 and 124. The shunt 140 has a high resistance, usually on the order of thousands of ohms. In one embodiment, the shunt 140 has a resistance of less than ten thousand ohms. In a preferred embodiment, the shunt 140 has a resistance of approximately one thousand to five thousand ohms. Thus, the resistance of the shunt 140 is between that of a conventional very low resistance shunt and a conventional high resistance shunt. Furthermore, the shunt 140 is permanent and is thus not to be removed from contact with the test pads 122 and 124. Instead, the shunt 140 is only removed from electrical contact with the MR sensor 30 when the test section 120 is cut off using cut-off line 130.

The shunt 140 is coupled directly to the test pads 122 and 124 to help ensure that a transient current due to ESD does not travel through the MR sensor 30. Typically, transient current through the MR head 10 occurs when a device, such as a metal probe, makes contact with the test pads 122 or 124, for example when handling the suspension assembly 100 during manufacturing. The shunt 140 reduces or prevents the flow of transient current in such situations because of the location of the shunt 140. Because the shunt 140 couples the test pads 122 and 124 a probe contacting the test pad 122 or the test pad 124 will see what amounts to a loop of wire with varying resistance. Consequently, one side of the MR sensor 30 will not have a different potential than the other side of the MR sensor 30. As a result, a transient current will generally not flow through the MR sensor 30. The MR sensor 30 will, therefore, be protected from ESD induced damage.

Note that the shunt 140 functions best when at the test pads 122 and 124. This is because a probe contacting the test pads or other conductor between the MR sensor 30 and the test pads 122 and 124 will see a loop of wire. If the shunt 140 was located farther from the test pads 122 and 124, for example between the leads 102 and 104, a probe contacting one of the test pads 122 or 124 would be exposed to a capacitance, which might cause a transient current in the MR head 10. The capacitance is present because the probe would be exposed to a loop of wire, which contains the MR sensor and the shunt and a long wire coupled to either the test pad 122 or the test pad 124. In order to prevent this, it is preferable to have the shunt 140 located between the test pads 122 and 124.

Furthermore, because of the relatively high resistance of the shunt 140, the shunt 140 does not adversely affect the magnetic test or the quasi-static test. The resistance of the MR sensor 30 is typically on the order of fifty ohms or less. The resistance of the shunt 140 is on the order of thousands of ohms. Consequently, when current is driven through the MR sensor 30 using the test pads 122 and 124, the shunt 140 draws only a very small percentage of the current. Typically, the shunt 140 draws five percent or less of the current driven through the test pads 122 and 124. Consequently, the magnetic test and quasi-static test are not greatly affected by the presence of the shunt 140. Thus, the permanent shunt 140 protects the MR sensor 30 from ESD damage throughout fabrication. Furthermore, the permanent shunt 140 does not adversely affect testing of the MR head 10.

Figure 3B:
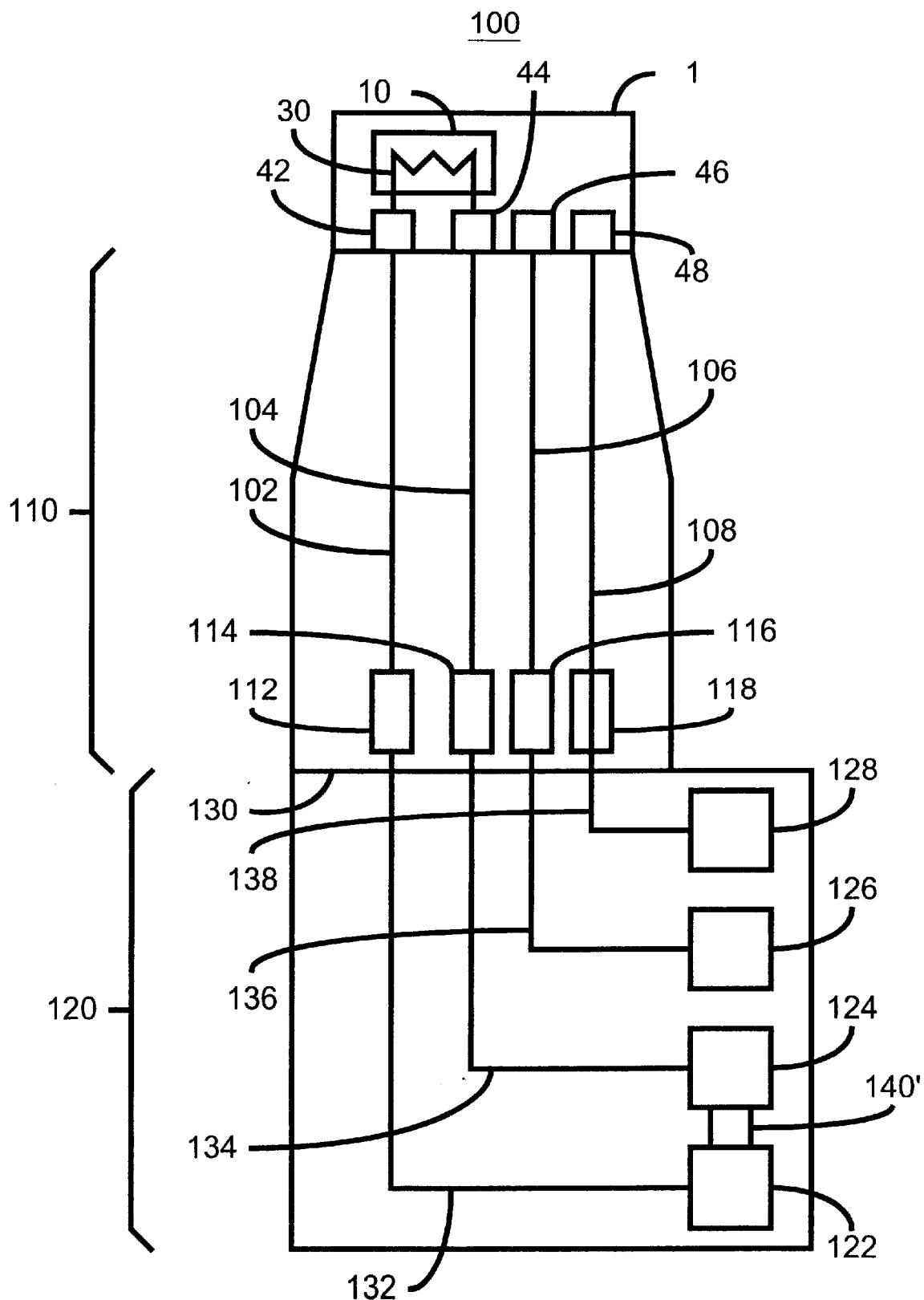
FIG. 3B is a block diagram of another embodiment of a first embodiment of a suspension assembly in accordance with the present invention.

FIG. 3B depicts another embodiment of the suspension assembly 100. The suspension assembly 100 depicted in FIG. 3B is substantially the same as the suspension assembly 100 depicted in FIG. 3A. However, the configuration of the shunt 140' is slightly different. The shunt 140' has essentially the same properties as the shunt 140. Thus, the shunt 140' is able to protect the MR sensor 30 from ESD induced damage without adversely affecting the magnetic test or the quasi-static test. However, the shunt 140' appears as a joint between the test pads 122 and 124.

Figure 3C:
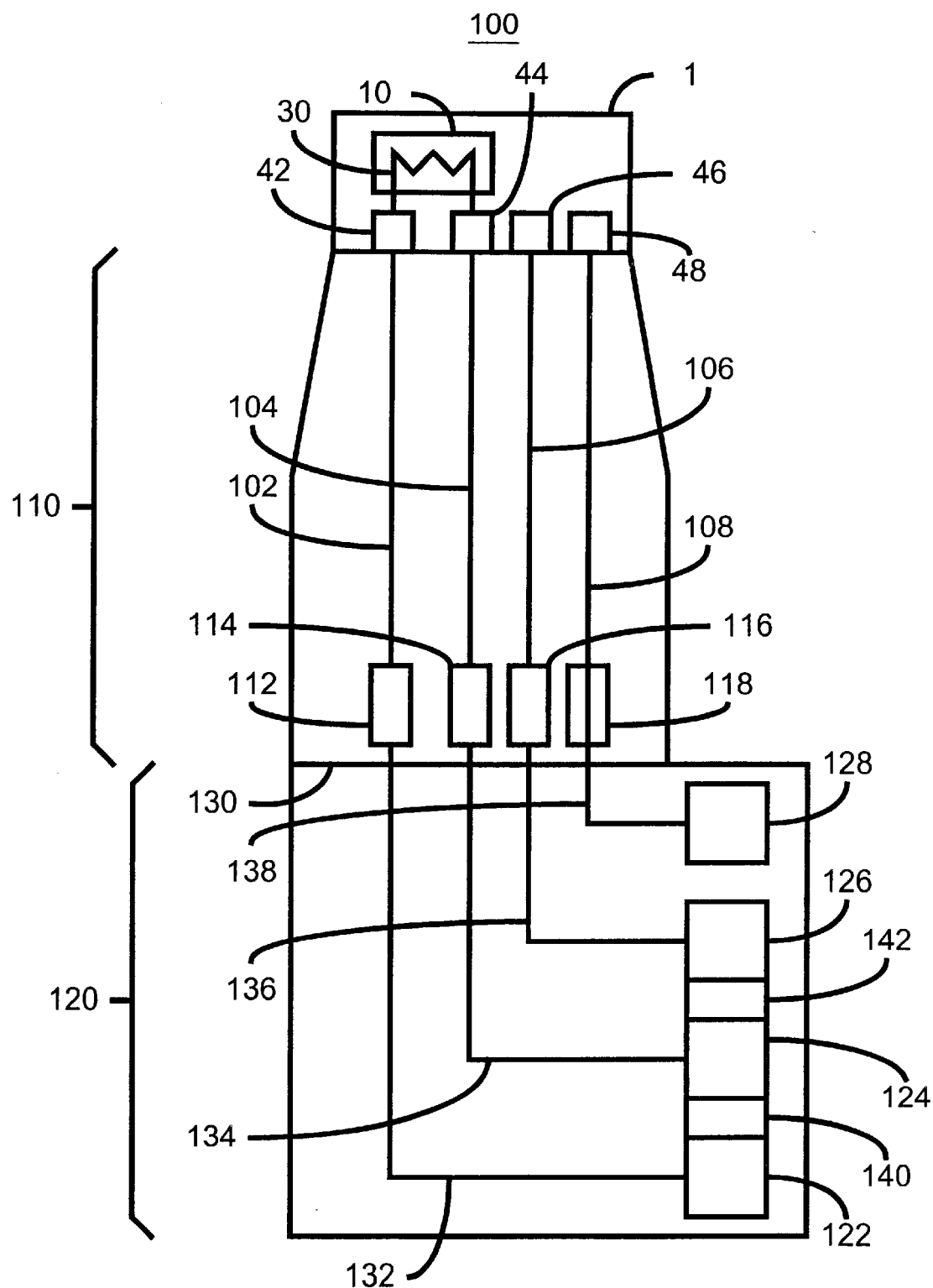
FIG. 3C is a block diagram of another embodiment of a first embodiment of a suspension assembly in accordance with the present invention.

FIG. 3C depicts another embodiment of the suspension assembly 100. Most of the suspension assembly 100 depicted in FIG. 3C is substantially similar to the suspension assembly 100 depicted of FIG. 3A. In addition to the permanent shunt 140, a second permanent shunt 142 directly between the test pads 122 and 124 is provided. The second permanent shunt 142 allows any tribo-charge which may be provided to the pads 124 or 126 to have an additional avenue for dissipation. In particular, the write head (not shown) and the leads 146 and 148 leading to the write head (not shown) also have a capacitance. This capacitance can be termed a write head capacitor. Consequently, any charge provided to the test pads 122 or 124 will be likely to flow to the write head capacitor to which the test pads 122 and 124 are linked via the second shunt 142. Because any tribo-charge has another avenue for dissipation, the MR sensor 30 is even less likely to be damaged due to ESD damage.

Figure 4A:
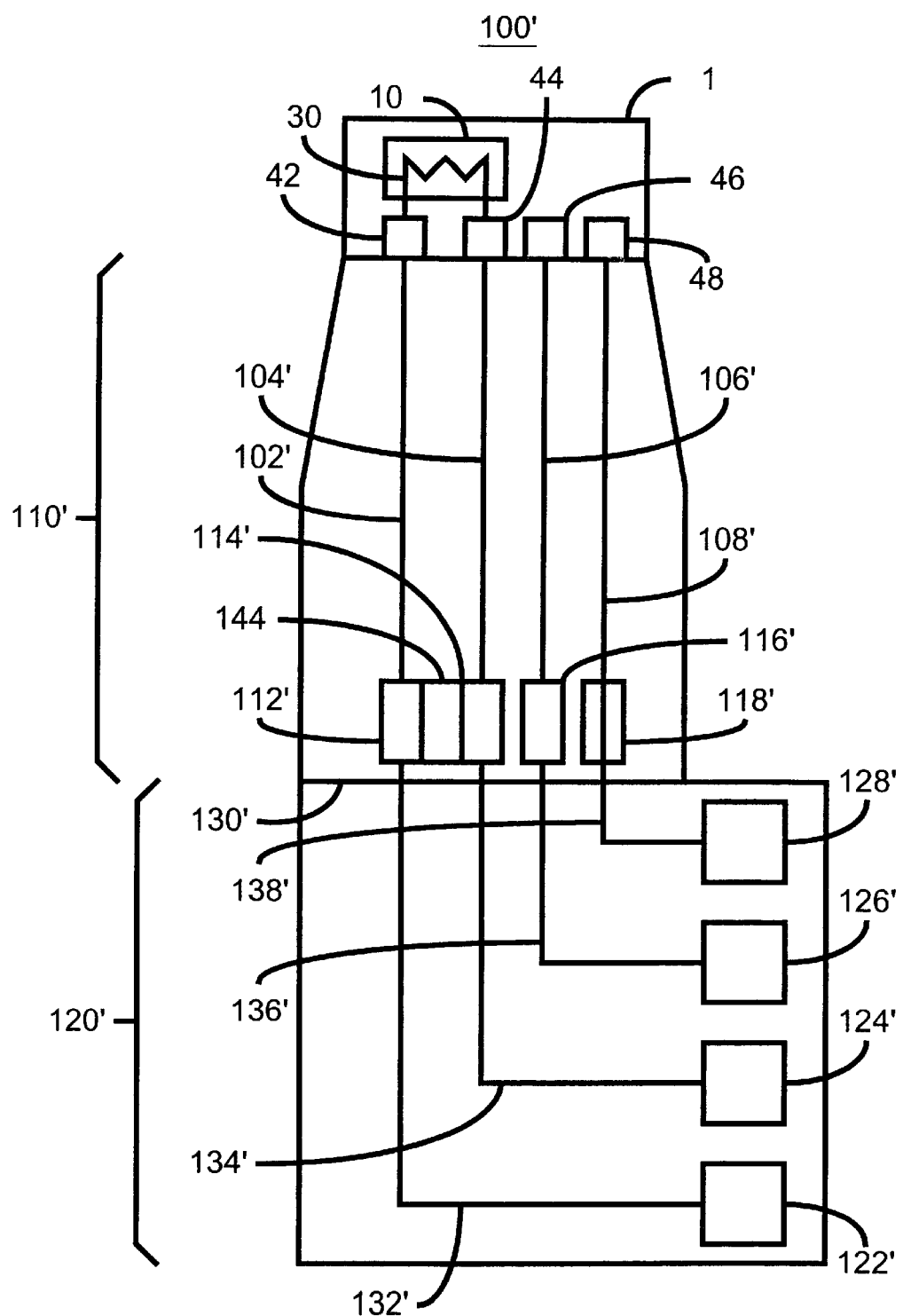
FIG. 4A is a block diagram of one embodiment of a second embodiment of a suspension assembly in accordance with the present invention.

FIG. 4A depicts another embodiment of the suspension assembly 100'. The suspension assembly 100' is preferably a FOS or TSA suspension assembly. Many components of the suspension assembly 100' are substantially the same as the suspension assembly 100 depicted in FIG. 3A. Consequently, these components are labeled similarly. For example, the test portion 120' corresponds to the test portion 120. However, the shunt 140 is not present in the embodiment of the suspension assembly 100' depicted in FIG. 4A. Instead, the suspension assembly 100' includes a permanent shunt 144 directly between the pads 112' and 114'. The permanent shunt 144 has a moderately high resistance, generally on the order of thousands of ohms. In one embodiment, the resistance of the permanent shunt 144 has a resistance of less than ten thousand ohms. In a preferred embodiment, the permanent shunt 144 has a resistance on the order of one thousand to five thousand ohms.

Because the permanent shunt 144 is above the cut-off line 130', the permanent shunt 144 is present even when the test portion 120' is cut off at cut-off line 130'. The permanent shunt 144 remains even during normal operation of the MR sensor 30. As a result, the permanent shunt 144 can protect the MR sensor 30 even after the test portion 120' has been cut off. Because the permanent shunt 144 is between the head gimbal assembly pads 112' and 114', the permanent shunt 144 is particularly useful to protecting the MR sensor 30 from damage due to a probe contacting the head gimbal assembly pads 112 ' or 114'. Thus, the permanent shunt 144 functions similarly to the shunts 140 and 140' depicted in FIGS. 3A and 3B. Furthermore, because the permanent shunt 144 has a high resistance relative to the MR sensor 30, the permanent shunt 144 does not adversely affect performance of the MR sensor 30. In particular, the permanent shunt 144 only draws a few percent, or less, of the current driven through the MR sensor 30. Consequently, the permanent shunt 144 can protect the MR sensor 30 without adversely affecting the performance of the MR sensor 30.

Figure 4B:
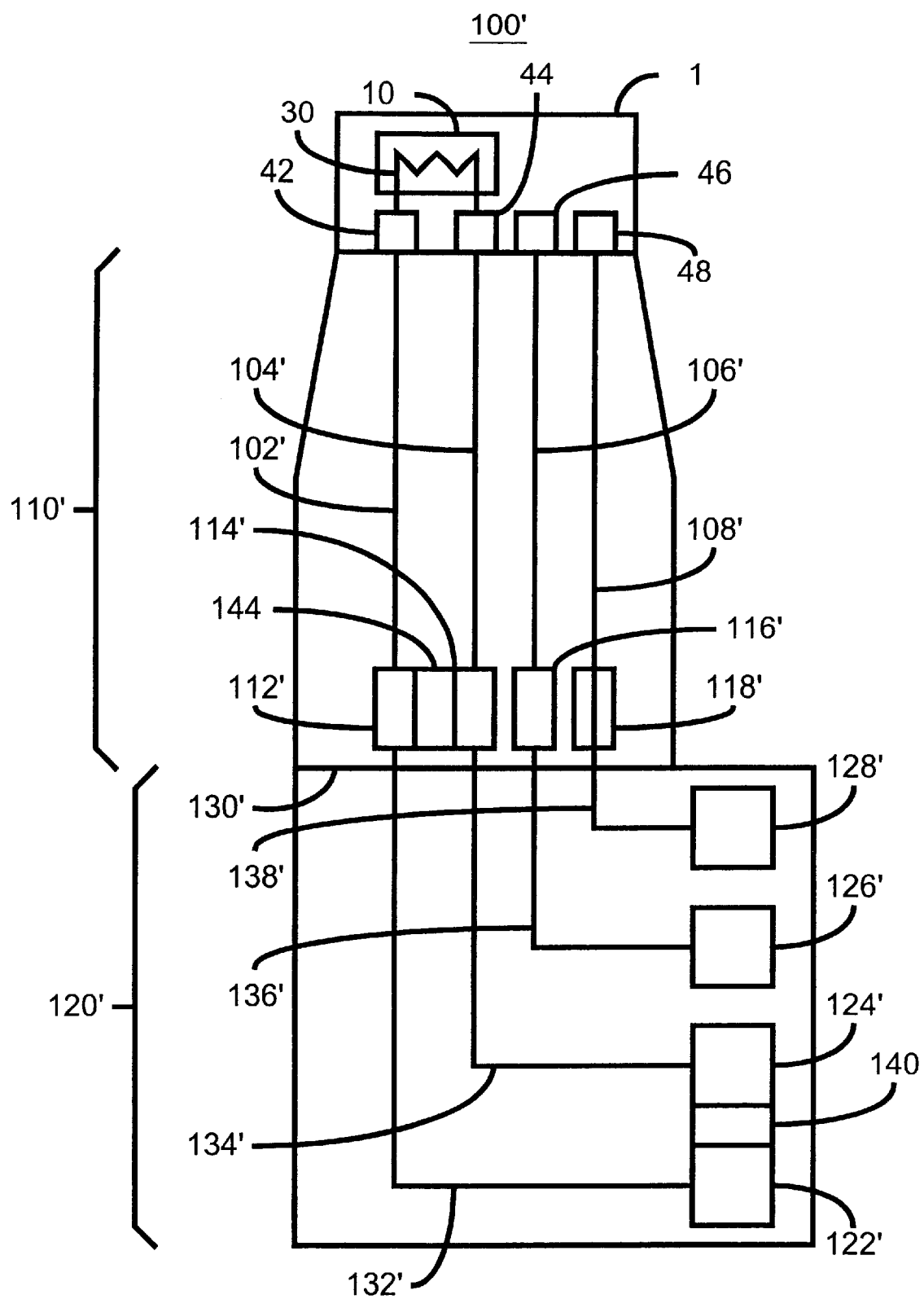
FIG. 4B is a block diagram of another embodiment of a second embodiment of a suspension assembly in accordance with the present invention.

FIG. 4B depicts another embodiment of the suspension assembly 100'. The suspension assembly 100' depicted in FIG. 4B is substantially the same as the suspension to assembly depicted in FIG. 4A. However, in addition to the permanent shunt 144, the suspension assembly 100' depicted in FIG. 4B also includes a shunt 140 between the pads 122' and 124'. Note that the shunt 140' could be used in place of the shunt 140 in the suspension assembly 100'. The permanent shunt 144 used without the shunt 140 may represent a capacitance which may allow at least some of a tribo-charge accumulated by contact to the test pad 122' or 124' to flow through the MR sensor 30. The combination of the permanent shunt 140 and the permanent shunt 144 protect the MR sensor 30 from damage due to tribo-charges from contact with the test pads 122' and 124' during fabrication or from contact to the head gimbal assembly pads 112' and 114' during or after fabrication. Furthermore, the shunts 144 and 140 do not adversely affect performance of the MR sensor 30 during testing or operation.

Figure 4C:
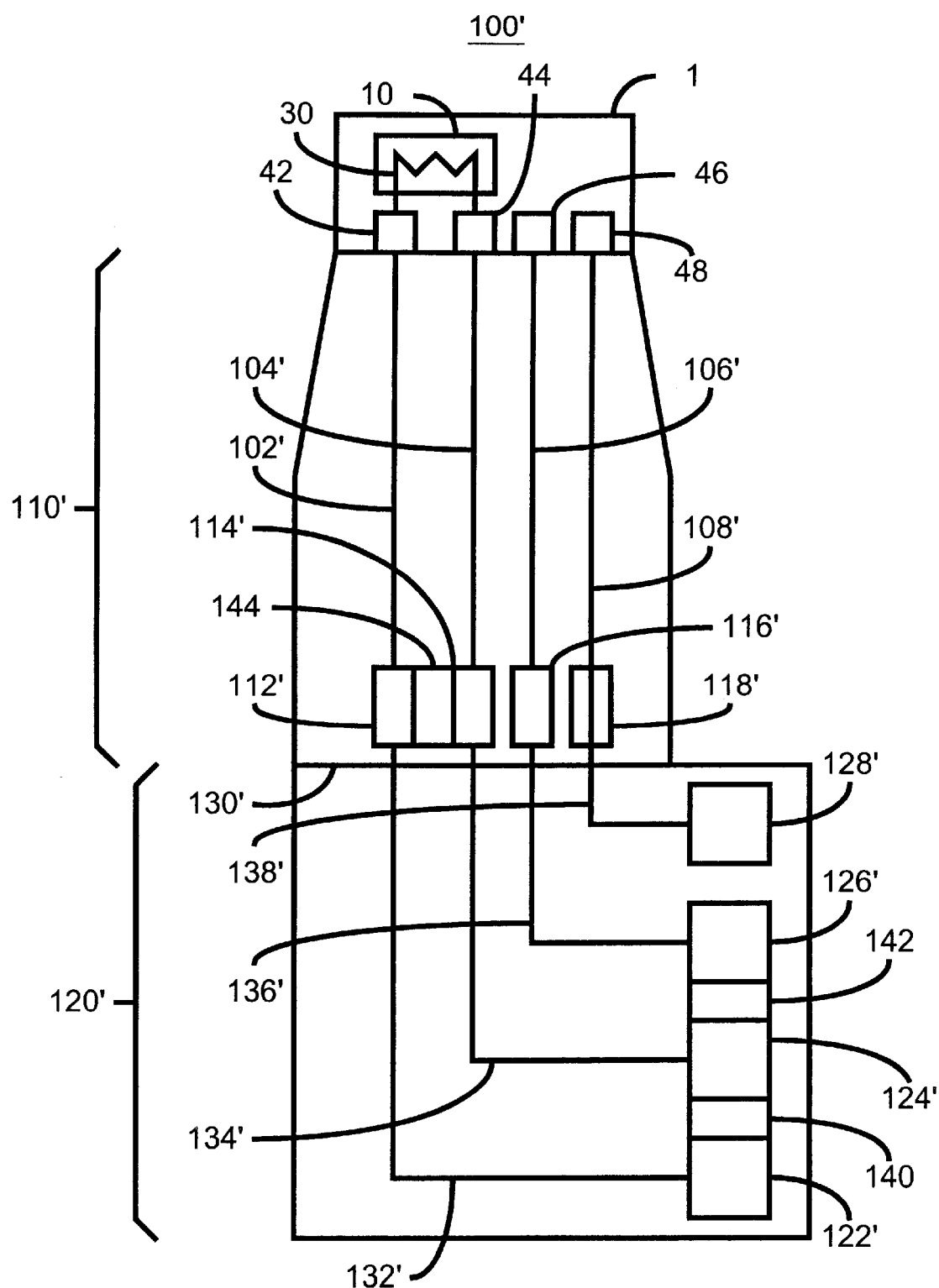
FIG. 4C is a block diagram of another embodiment of a second embodiment of a suspension assembly in accordance with the present invention.

FIG. 4C depicts another embodiment of the suspension assembly 100'. In addition to the permanent shunt 144, the suspension assembly 100' depicted in FIG. 4C includes the shunt 140 between the test pads 122' and 124' and the shunt 142 between the test pads 124' and 126'. Thus, in addition to the benefits of the shunts 140 and 144, the suspension assembly 100' depicted in FIG. 4C also has a capacitance, through the shunt 142, the leads 136 and 106 and the write head. This capacitance provides another mechanism for holding and dissipating a tribo-charge induced on the suspension assembly 100'. Consequently, the MR sensor 30 is further protected against ESD induced damage without adversely affecting performance of the MR sensor 30.

Figure 5A:
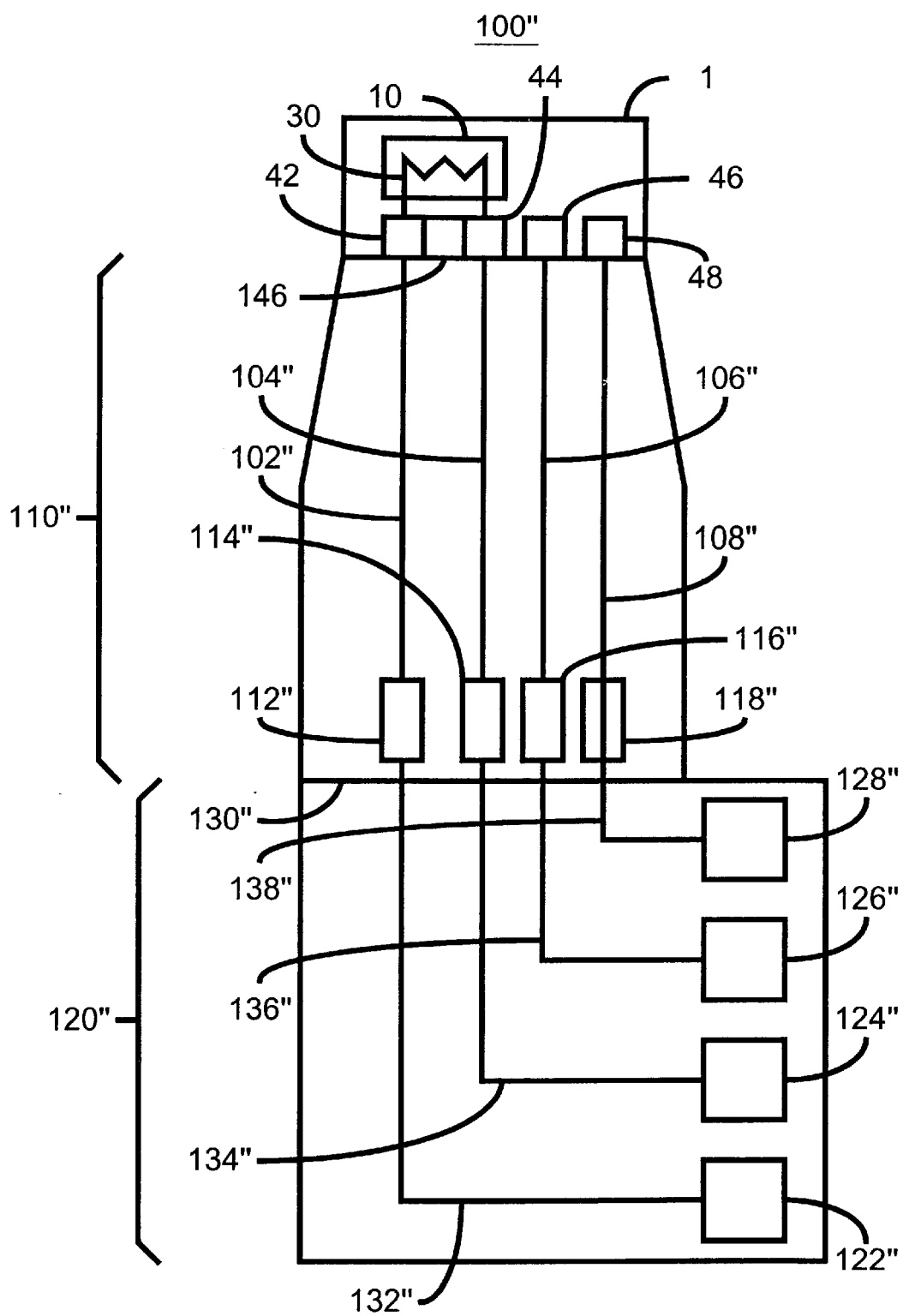
FIG. 5A is a block diagram of one embodiment of a third embodiment of a suspension assembly in accordance with the present invention.

FIG. 5A depicts another embodiment of the suspension assembly 100". The suspension assembly 100" is preferably a FOS or TSA suspension assembly. The suspension assembly 100" is a substantially the same as the suspension assembly 100 depicted in FIG. 3A. Consequently, these components are labeled similarly. For example, the test portion 120" is substantially the same as the test portion 120. However, the suspension assembly 100" in FIG. 5A includes a shunt 146 in lieu of the shunt 140 depicted in FIG. 3A.

Referring to FIG. 5A, the shunt 146 is directly between the pads 42 and 44 of the slider 1. The permanent shunt 146 has a moderately high resistance, generally on the order of thousands of ohms. In one embodiment, the resistance of the permanent shunt 146 has a resistance of less than ten thousand ohms. In a preferred embodiment, the permanent shunt 146 has a resistance on the order of one thousand to five thousand ohms.

Because the permanent shunt 146 is above the cut-off line 130", the permanent shunt 146 is present even when the test portion 120" is cut off at cut-off line 130". The permanent shunt 146 remains even during normal operation of the MR sensor 30. As a result, the permanent shunt 146 can protect the MR sensor 30 even after the test portion 120" has been cut off. Because the permanent shunt 146 is between the pads 42 and 44, the permanent shunt 146 is particularly useful to protecting the MR sensor 30 from damage due to a probe contacting the pads 42 or 44. Thus, the permanent shunt 146 functions similarly to the shunts 140 and 140' depicted in FIGS. 3A and 3B. Furthermore, because the permanent shunt 146 has a high resistance relative to the MR sensor 30, the permanent shunt 146 does not adversely affect performance of the MR sensor 30. In particular, the permanent shunt 146 only draws a few percent, or less, of the current driven through the MR sensor 30. Consequently, the permanent shunt 146 can protect the MR sensor 30 without adversely affecting the performance of the MR sensor 30.

Figure 5B:
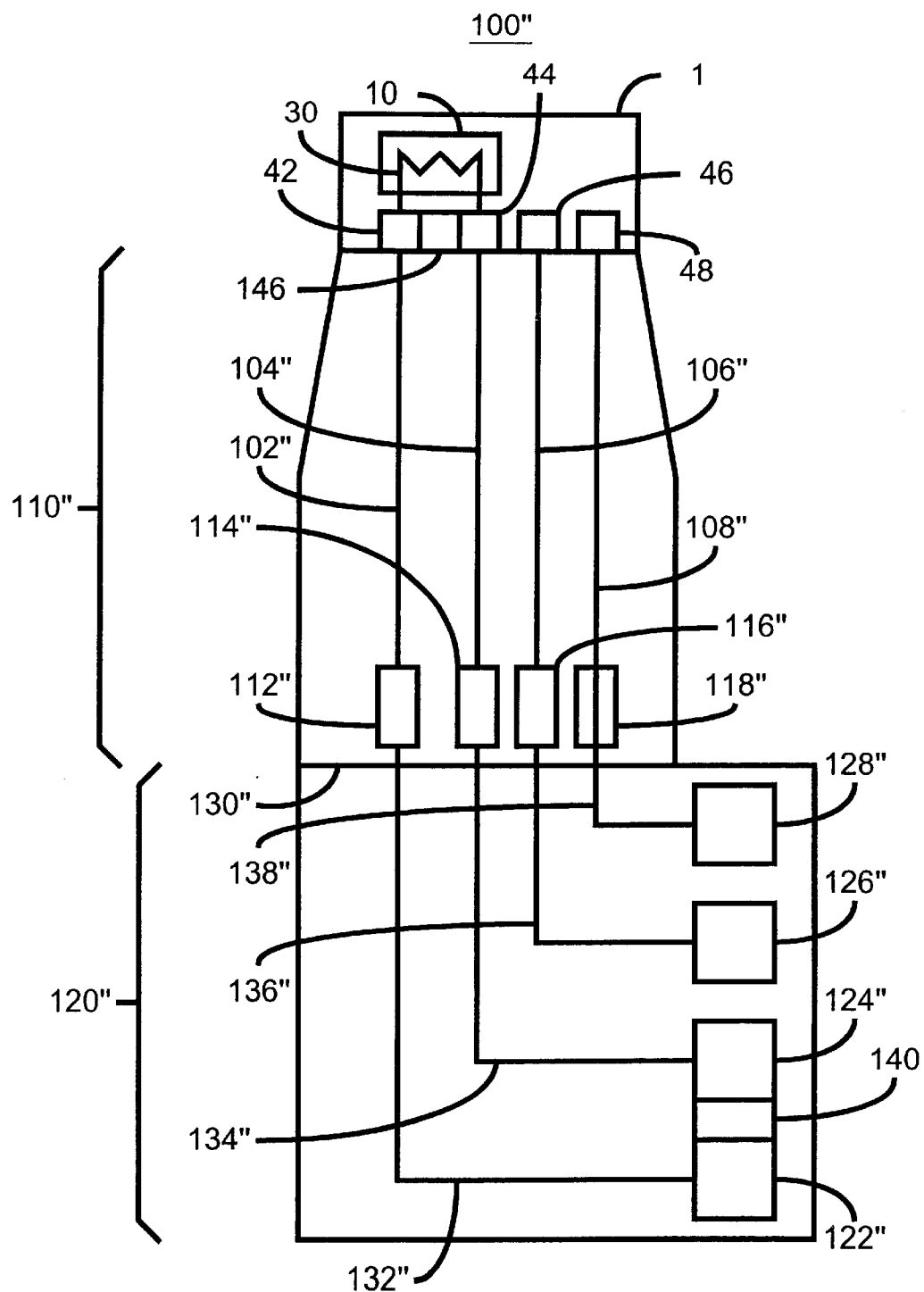
FIG. 5B is a block diagram of another embodiment of a third embodiment of a suspension assembly in accordance with the present invention.

FIG. 5B depicts another embodiment of the suspension assembly 100". The suspension assembly 100" depicted in FIG. 5B is substantially the same as the suspension assembly depicted in FIG. 5A. However, in addition to the permanent shunt 146, the suspension assembly 100" depicted in FIG. 5B also includes a shunt 140 between the pads 122" and 124". Note that the shunt 140' could be used in place of the shunt 140 in the suspension assembly 100". The permanent shunt 146 used without the shunt 140 may represent a capacitance which may allow at least some of a tribo-charge accumulated by contact to the test pad 122" or 124" to flow through the MR sensor 30. The combination of the permanent shunt 140 and the permanent shunt 146 protect the MR sensor 30 from damage due to tribo-charges from contact with the test pads 122" and 124" during fabrication or from contact to the pads 42 and 44 during or after fabrication. Furthermore, the shunts 144 and 140 do not adversely affect performance of the MR sensor 30 during testing or operation.

Figure 5C:
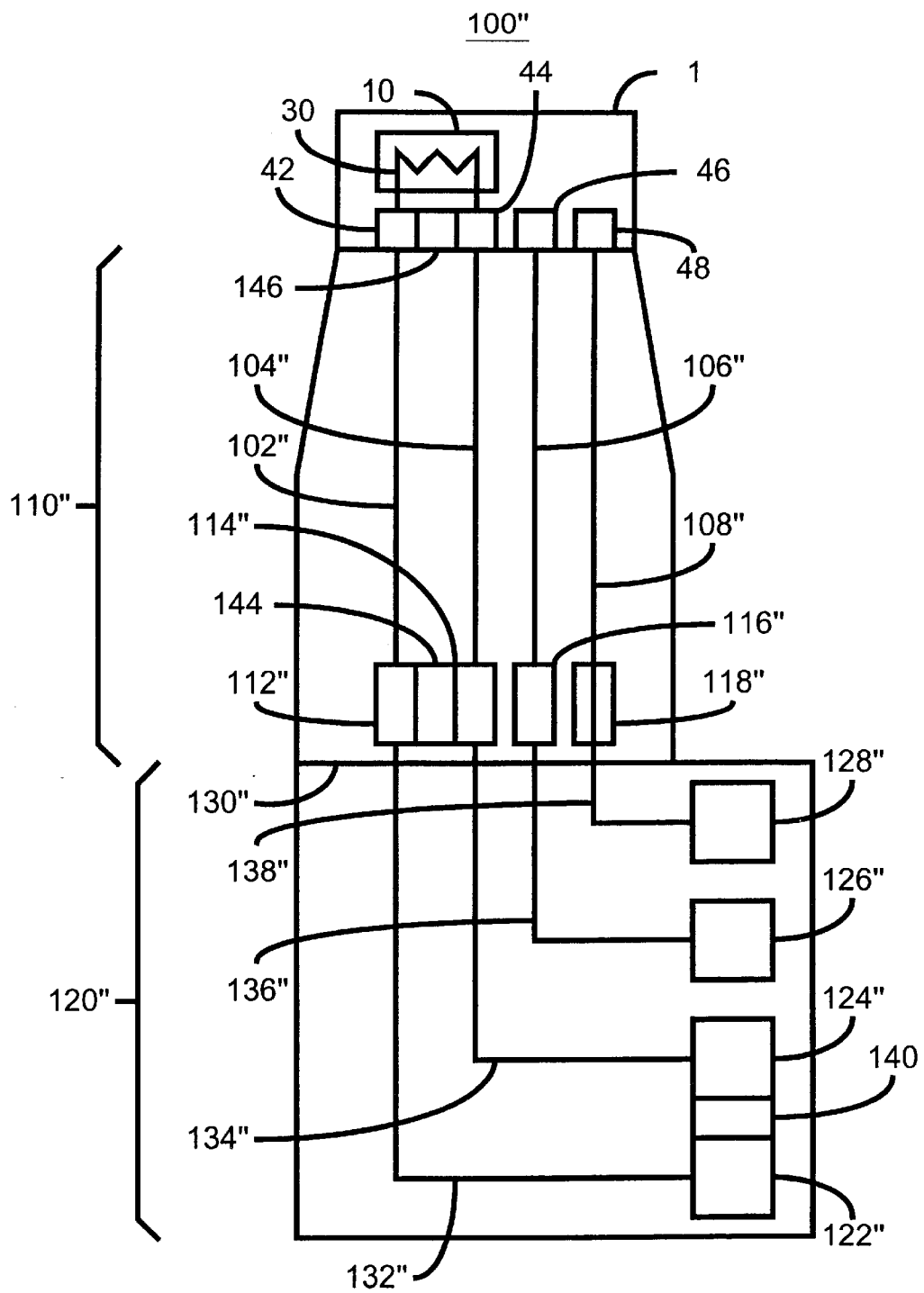
FIG. 5C is a block diagram of another embodiment of a third embodiment of a suspension assembly in accordance with the present invention.

FIG. 5C depicts another embodiment of the suspension assembly 100". In addition to the permanent shunt 146, the suspension assembly 100" depicted in FIG. 5C includes the shunt 140 between the test pads 122" and 124" as well as a shunt 144 between the head-gimbal assembly pads 112" and 114'. Thus, in addition to the benefits of the shunts 140 and 146, the suspension assembly 100" depicted in FIG. 5C also has a capacitance, through the shunt 146 and the write head. This capacitance provides another mechanism for holding and dissipating a tribo-charge induced on the suspension assembly 100". Consequently, the MR sensor 30 is further protected against ESD induced damage without adversely affecting performance of the MR sensor 30.

Figure 5D:
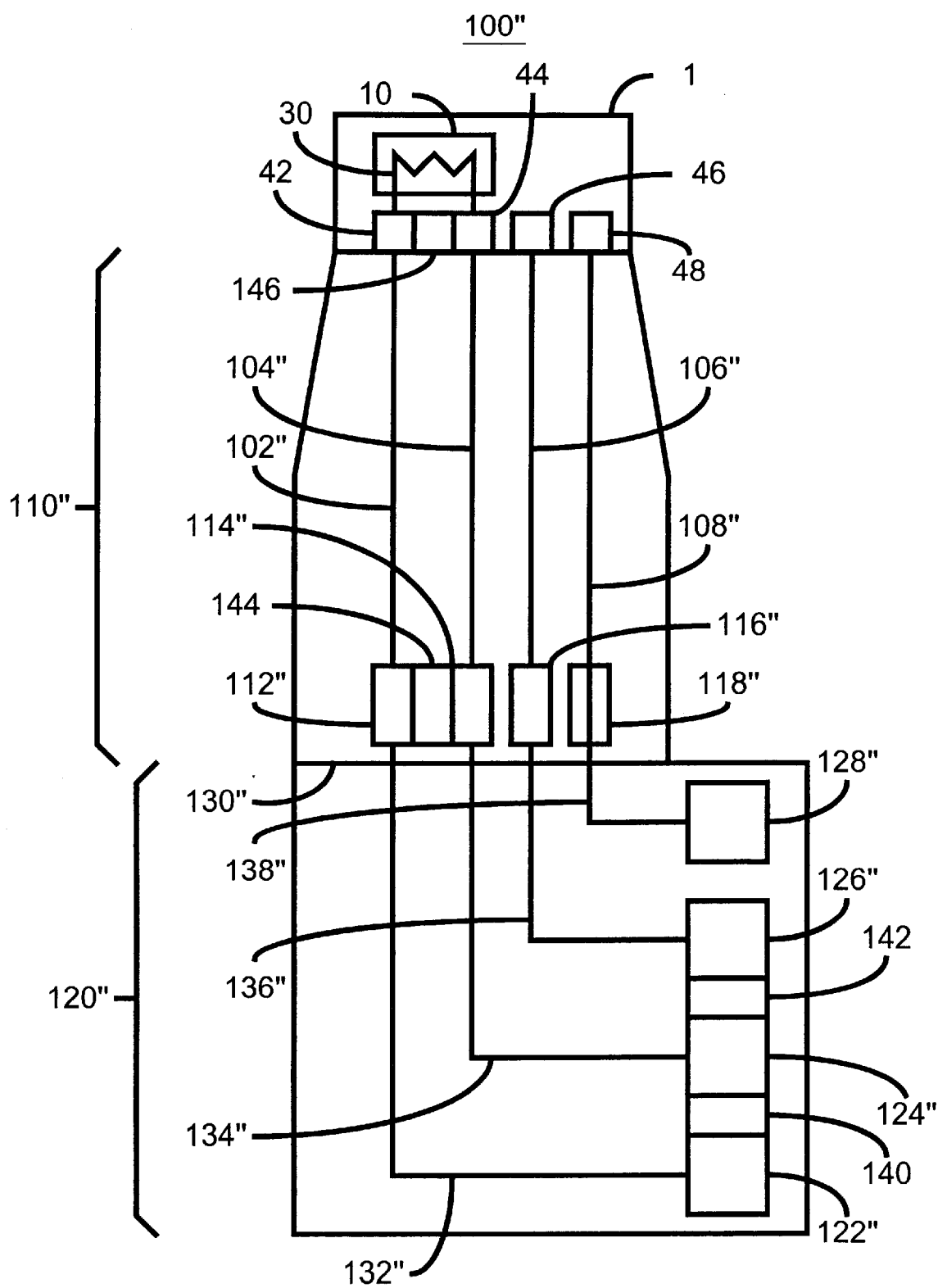
FIG. 5D is a block diagram of another embodiment of a third embodiment of a suspension assembly in accordance with the present invention.

FIG. 5D depicts another embodiment of the suspension assembly 100". In addition to the permanent shunt 146, the suspension assembly 100" depicted in FIG. 5D includes the shunt 140 between the test pads 122" and 124" and the shunt 144 between the head gimbal assembly pads 112" and 114". Thus, in addition to the benefits of the shunts 140 and 146, the suspension assembly 100" depicted in FIG. 5D also has protection from a charge induced by a probe touching the head gimbal assembly pads 112' and 114'. Consequently, the MR sensor 30 is further protected against ESD induced damage without adversely affecting performance of the MR sensor 30. Furthermore, the suspension assembly 100" also includes the shunt 142, which provides another avenue for holding and dissipating a tribo-charge, using the capacitance of the write head (not shown).

Figure 5E:
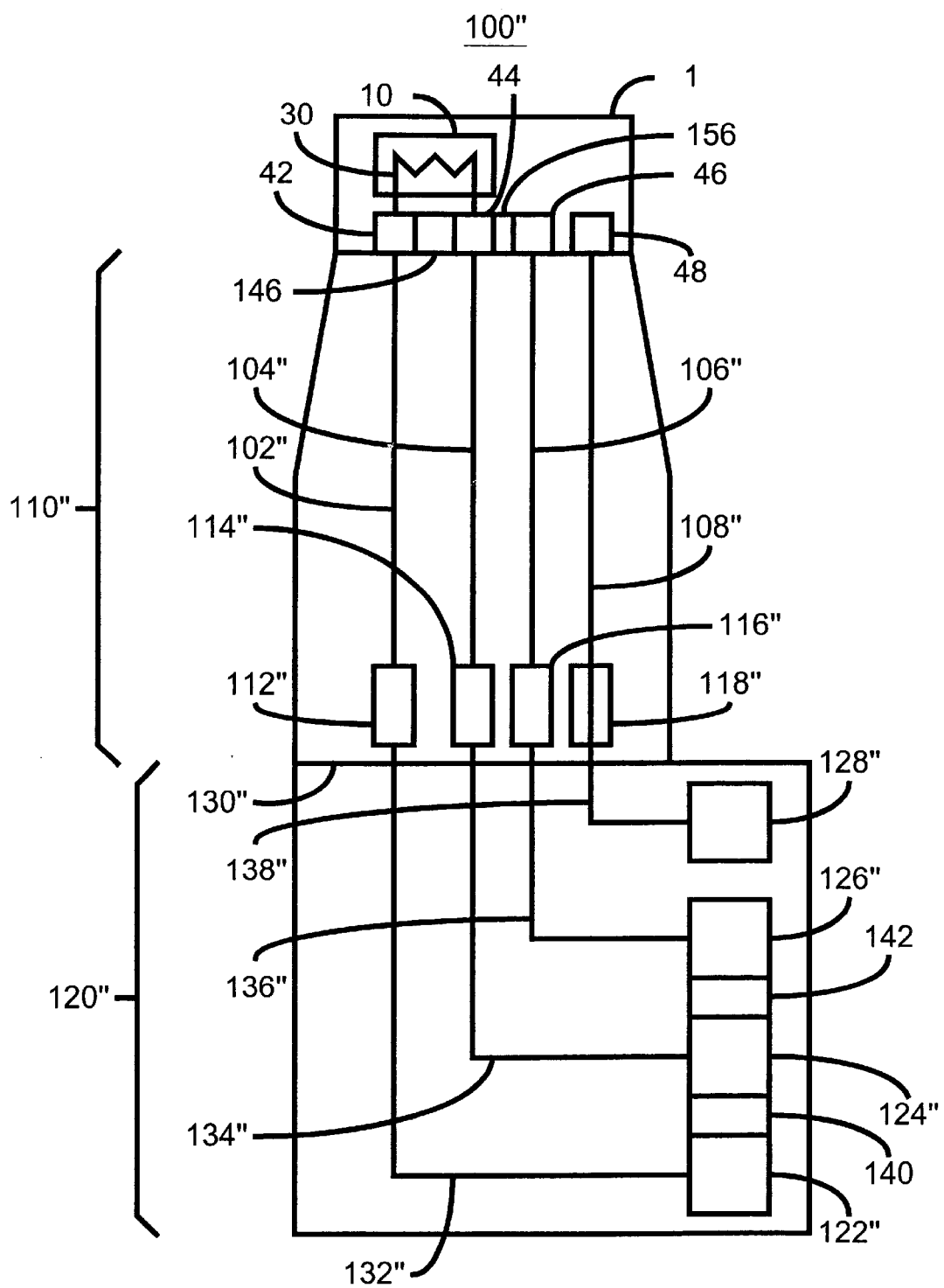
FIG. 5E is a block diagram of another embodiment of a third embodiment of a suspension assembly in accordance with the present invention.

FIG. 5E depicts another embodiment of the of the suspension assembly 100". In addition to the permanent shunt 146, the suspension assembly 100" depicted in FIG. 5E includes the shunt 140 between the test pads 122" and 124", the shunt 156 between the 1537P/RRI612 22 slider pads 44 and 46 and the shunt 142 between the test pads 124" and 126". Thus, in addition to the benefits of the shunts 140 and 146, the suspension assembly 100" depicted in FIG. 5E also has ESD protection due to the capacitance of the write head (not shown). Consequently, the MR sensor 30 is further protected against ESD induced damage without adversely affecting performance of the MR sensor 30.

Thus, using one or more permanent shunts, the MR sensor 30 can be protected from ESD induced damage during and after fabrication. Because the permanent shunts have a relatively large resistance the permanent shunts do not substantially affect testing or operation of the MR sensor 30. Furthermore, the present invention can use any combination of the shunts 140, 142, 144, 146, 156 and other shunts between the head gimbal assembly pads 114 and 116 or 114" and 116" (which would function similarly to the shunts 142 and 156).

A method and system has been disclosed for a permanent shunt for allowing an MR head to have greater resistance to ESD damage. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for protecting a magnetoresistive (MR) head from electrostatic discharge damage, the MR head including an MR sensor having a first end and a second end, the MR head being coupled with a suspension assembly including a first lead coupled with the first end of the MR sensor, a second lead coupled with the second end of the MR sensor, and an insulating film substantially supporting a first portion of the first lead and a second portion of the second lead, the system comprising a first test pad coupled with the first lead;
a second test pad coupled with the second lead, the first test pad and the second test pad for testing the MR head;
a permanent resistor coupled to the first test pad and to the second test pad, the resistor having a resistance of less than approximately ten thousand ohms.

2. The system of claim 1 wherein the permanent resistor is between one thousand and five thousand ohms.

3. The system of claim 1 wherein the suspension assembly further includes a first head gimbal assembly pad coupled with the first lead and a second head gimbal assembly pad coupled to the second lead, the system further comprising:

a second permanent resistor coupled to the first head gimbal assembly pad and to the second head gimbal assembly pad during operation of the MR head.

4. The system of claim 3 wherein the second permanent resistor is between one thousand and five thousand ohms.

5. The system of claim 3 wherein the MR head further includes a first pad and a second pad, the first pad being coupled with the first end of the MR sensor and the first lead, the second pad being coupled with the second end of the MR sensor and the second lead, the system further comprising:

a third permanent resistor coupled to the first pad and to the second pad during use of the MR head.

6. The system of claim 5 wherein the second permanent resistor and the third permanent resistor are each between one thousand and five thousand ohms.

7. The system of claim 1 wherein the MR head further includes a first pad and a second pad, the first pad being coupled with the first end of the MR sensor and the first lead, the second pad being coupled with the second end of the MR sensor and the second lead, the system further comprising:

a second permanent resistor coupled to the first pad and to the second pad.

8. The system of claim 1 wherein the MR head is part of a merged head including a write head, the system further comprising:

a third test pad coupled with the write head;

a fourth test pad coupled with the write head, the third test pad and the fourth test pad for testing the write head; and a second permanent resistor coupled to the third test pad and to the fourth test pad, the second permanent resistor being less than ten thousand ohms.

9. The system of claim 8 wherein the second permanent resistor is between one thousand and five thousand ohms.

10. The system of claim 1 wherein the first test pad, the second test pad and the permanent resistor can be cut off after manufacture is complete.

11. A suspension assembly for use with a magnetoresistive (MR) head, the MR head including an MR sensor having a first end and a second end, the system comprising:

a first lead coupled with the first end of the MR sensor;

a second lead coupled with the second end of the MR sensor;

an insulating film substantially supporting a first portion of the first lead and a second portion of the second lead;

a first head gimbal assembly pad coupled with the first lead;

a second head gimbal assembly pad coupled to the second lead; and a permanent resistor coupled to the first head gimbal assembly pad and to the second head stack assembly pad during operation of the MR head.

12. The suspension assembly of claim 11 wherein the permanent resistor is between on thousand and five thousand ohms.

13. The suspension assembly of claim 11 wherein the MR head further includes a first pad and a second pad, the first pad being coupled with the first end of the MR sensor and the first lead, the second pad being coupled with the second end of the MR sensor and the second lead, the system further comprising:

a second permanent resistor coupled to the first pad and to the second pad during use of the MR head.

14. A slider comprising:

a magnetoresistive (MR) head, the MR head including an MR sensor having a first end and a second end;

a first pad coupled with the first end of the MR sensor;

a second pad coupled with the second end of the MR sensor, the first pad and the second pad for providing current to the MR sensor during use of the MR head;

a permanent resistor coupled to the first pad and to the second pad during use of the MR head.

15. The slider of claim 14 wherein the resistor is between approximately one thousand and five thousand ohms.

* * * * *